US012624972B2

(12) United States Patent    (10) Patent No.: US 12,624,972 B2

Tanaka et al.    (45) Date of Patent: May 12, 2026

(54) MEASUREMENT DEVICE FOR MEASURING TEMPERATURE OR DISTORTION OF AN OPTICAL FIBER, METHOD OF ADJUSTING MEASUREMENT DEVICE, AND MEASUREMENT METHOD FOR MEASURING TEMPERATURE OF DISTORTION OF AN OPTICAL FIBER

(71) Applicant: NATIONAL UNIVERSITY CORPORATION TOKYO UNIVERSITY OF AGRICULTURE AND TECHNOLOGY, Fuchu (JP)

(72) Inventors: Yosuke Tanaka, Fuchu (JP); Daiki Saito, Fuchu (JP)

(73) Assignee: NATIONAL UNIVERSITY CORPORATION TOKYO UNIVERSITY OF AGRICULTURE AND TECHNOLOGY (JP)

( * ) Notice: Subject to any disclaimer, the term of this patent is extended or adjusted under 35 U.S.C. 154(b) by 1 day.

(21) Appl. No.: 18/277,910

(22) PCT Filed: Feb. 14, 2022

(86) PCT No.: PCT/JP2022/005619

§ 371 (c)(1),
(2) Date: Aug. 18, 2023

(87) PCT Pub. No.: WO2022/181373

PCT Pub. Date: Sep. 1, 2022

(65) Prior Publication Data

US 2024/0133720 A1    Apr. 25, 2024
US 2024/0230382 A9    Jul. 11, 2024

(30) Foreign Application Priority Data

Feb. 26, 2021    (JP) ................................. 2021-030156

(51) Int. Cl.
   *G01D 5/353*    (2006.01)
   *G01B 11/16*    (2006.01)
   *G01K 11/322*    (2021.01)

(52) U.S. Cl.
   CPC ....... *G01D 5/35364* (2013.01); *G01B 11/165* (2013.01); *G01K 11/322* (2021.01)

(58) Field of Classification Search
   CPC ............ G01D 5/35364; G01B 11/165; G01K 11/322; G01K 11/32
   See application file for complete search history.

(56) References Cited

U.S. PATENT DOCUMENTS 9,500,596 B2 * 11/2016 Gosteli ............. G01N 21/8806
2010/0225900 A1 * 9/2010 Hotate ................... G01M 11/39
                 356/73.1

(Continued)

FOREIGN PATENT DOCUMENTS

CN    111721338 A * 9/2020 ......... G01D 5/35364
CN    119178511 A * 12/2024 ........... G01J 3/0205

(Continued)

OTHER PUBLICATIONS

Y. Tanaka and Y. Ozaki, "Brillouin frequency shift measurement with virtually controlled sensitivity", Appl. Phys. Exp. 10, 062504 (2017) (5 pages).

(Continued)

*Primary Examiner* — Michelle M Iacoletti
*Assistant Examiner* — Maher Yazback
(74) *Attorney, Agent, or Firm* — Harness, Dickey & Pierce, P.L.C.

(57)        ABSTRACT

A measurement device includes a splitter splitting light from a light source into first and second lights; an optical frequency shifter shifting a frequency of the first light; a first optical modulator modulating intensity of the first light and (Continued)

generating probe light having two frequency components; a second optical modulator generating pump light by pulsing the second light; an optical detector detecting, when the probe light is incident from a first end of an optical fiber to be measured and the pump light is incident from a second side of the optical fiber, light emitted from the second side of the optical fiber; and a processor measuring, based on detected light intensity, temperature or distortion of the optical fiber, in which a frequency of a lower one of the two frequency components yields Brillouin gain, and a frequency of a higher frequency component yields Brillouin loss.

12 Claims, 5 Drawing Sheets

(56) References Cited

U.S. PATENT DOCUMENTS

| | | | | |
|---|---|---|---|---|
| 2013/0236137 A1* | 9/2013 | Meister | G02B 6/12007 | |
| | | | 359/279 | |
| 2013/0308682 A1* | 11/2013 | Tur | G01D 5/35364 | |
| | | | 374/161 | |
| 2016/0182149 A1* | 6/2016 | Domínguez López | | |
| | | | H04B 10/07955 | |
| | | | 398/28 | |
| 2017/0067743 A1* | 3/2017 | Salit | G01C 19/66 | |
| 2020/0049799 A1* | 2/2020 | Ando | G01S 7/484 | |
| 2021/0018343 A1 | 1/2021 | Takahashi et al. | | |
| 2021/0148736 A1* | 5/2021 | Lee | H01S 3/2375 | |
| 2021/0215515 A1* | 7/2021 | Kwon | G01K 11/322 | |
| 2021/0318147 A1* | 10/2021 | Matsuura | G01D 5/35364 | |
| 2021/0382370 A1* | 12/2021 | Di Teodoro | G01S 17/26 | |

FOREIGN PATENT DOCUMENTS

| | | | | |
|---|---|---|---|---|
| EP | 2976603 B1 * | 8/2018 | | G01L 1/242 |
| JP | 2019-148466 A | 9/2019 | | |
| JP | 2019-184321 A | 10/2019 | | |
| WO | WO-2012119124 A1 * | 9/2012 | | G01D 5/35303 |
| WO | WO-2014067548 A1 * | 5/2014 | | G01M 11/39 |
| WO | WO-2014177198 A1 * | 11/2014 | | G01D 5/35358 |
| WO | WO-2015120888 A1 * | 8/2015 | | G01B 11/18 |

OTHER PUBLICATIONS

Y. Endo and Y. Tanaka, "Sensitivity enhancement of distributed Brillouinfiber optic sensing using two-frequency pump and probe", SPIE Conf 11525. on Future Sensing Technologies, Paper 11525-3 (2020) (6 pages).

A. Voskoboinik, J.Wang, B. Shamee, S. R. Nuccio, L. Zhang, MChitgarha, A.E. Willner, and M. Tur, "SBS-based fiber optical sensing using frequency-domain simultaneous tone interrogation", J. Lightwave Technol. 29, 1729-1735 (2011) (7 pages).

C. Jin, L. Wang, Y. Chen, N. Guo, W. Chung, H. Au, Z. Li, H-Y. Tam, and C.Lu, "Single measurement digital optical frequency comb based phase-detection Brillouin optical time domain analyzer", Opt. Exp. 25, 9213-9224 (2017) (12 pages).

Y. Tanaka, Y. Ozaki, and Y. So, "Scanless Brillouin gain spectrum measurement based on multiheterodyne detection," in Tech. Digest of International Cof. on Optical Fiber Sensors 2018, TuE88 (2018) (4 pages).

Y. Tanaka and T. Hasegawa, "Brillouin optical time domain analysis using spectrally reshaped 12-GHz spacing multimode pump and probe", Conference on Lasers and Electro-Optics (CLEO) 2020, paper SF3P.7 (2020) (2 pages).

Y. Peled, A. Motil, L. Yaron, and M. Tur, "Slope-assisted fast distributed sensing in optical fibers with arbitrary Brillouin profile", Opt. Express 19, 19845-19854 (2011) (10 pages).

H. Lee, N. Hayashi, Y. Mizuno, and K. Nakamura, "Slope-assisted Brillouinoptical correlation domain reflectometry: proof of concept", Photon. Jour. 8,6802807 (2016) (8 pages).

International Search Report (English and Japanese) issued in PCT/JP2022/005619, mailed May 10, 2022; ISA/JP (5 Pages).

Office Action issued in the corresponding Japanese Patent Application No. 2023-502291; mailed Feb. 3, 2026 (total 7 pages).

* cited by examiner

MEASUREMENT DEVICE FOR MEASURING TEMPERATURE OR DISTORTION OF AN OPTICAL FIBER, METHOD OF ADJUSTING MEASUREMENT DEVICE, AND MEASUREMENT METHOD FOR MEASURING TEMPERATURE OF DISTORTION OF AN OPTICAL FIBER

CROSS REFERENCE TO RELATED APPLICATIONS

This application is a 371 U.S. National Phase of International Application No. PCT/JP2022/005619, filed on Feb. 14, 2022, which claims priority to Japanese Patent Application No. 2021-030156, filed Feb. 26, 2021. The entire disclosures of the above applications are incorporated herein by reference.

TECHNICAL FIELD

The present invention relates to a measurement device for measuring temperature or distortion of an optical fiber, a method of adjusting the measurement device, and a measurement method.

BACKGROUND ART

Conventionally, many researches have been conducted on a technique of a distributed sensor using Brillouin scattering in an optical fiber. The distributed Brillouin sensing utilizes the fact that a Brillouin gain spectrum, which is a frequency area where Brillouin scattering occurs strongly, changes in proportion to distortion and temperature. In many methods, the frequency sweep of probe light is performed to observe a change in the Brillouin gain spectrum. In addition, proposed are a method of collectively acquiring a Brillouin gain spectrum using pump light and probe light made of multi-frequency light, and a method of appropriately shaping a spectrum of probe light while using pump light and probe light similarly made of multi-frequency light to utilize a change in optical power finally received in proportion to temperature or distortion. In addition, a study has been conducted on a method of using an area in which a change in Brillouin gain spectrum can be regarded as linear with respect to a frequency. However, such an area is narrow.

CITATION LIST

Non Patent Literature

NPL 1: Y Tanaka and Y. Ozaki, "Brillouin frequency shift measurement with virtually controlled sensitivity," Appl. Phys. Exp. 10, 062504 (2017).

NPL 2: Y. Endo and Y. Tanaka, "Sensitivity enhancement of distributed Brillouin fiber optic sensing using two-frequency pump and probe," SPIE Conf 11525. on Future Sensing Technologies, Paper 11525-3 (2020).

NPL 3: A. Voskoboinik, J. Wang, B. Shamee, S. R. Nuccio, L. Zhang, MChitgarha, A. E. Willner, and M. Tur, "SBS-based fiber optical sensing using frequency-domain simultaneous tone interrogation," J. Lightwave Technol. 29, 1729-1735 (2011).

NPL 4: C. Jin, L. Wang, Y Chen, N. Guo, W. Chung, H. Au, Z. Li, H-Y. Tam, and C. Lu, "Single-measurement digital optical frequency comb based phase-detection Brillouin optical time domain analyzer," Opt. Exp. 25, 9213-9224 (2017).

NPL 5: Y. Tanaka, Y. Ozaki, and Y. So, "Scanless Brillouin gain spectrum measurement based on multiheterodyne detection," in Tech. Digest of International Cof. on Optical Fiber Sensors 2018, TuE88 (2018).

NPL 6: Y. Tanaka and T. Hasegawa, "Brillouin optical time domain analysis using spectrally reshaped 12-GHz spacing multimode pump and probe," Conference on Lasers and Electro-Optics (CLEO) 2020, paper SF3P.7 (2020).

NPL 7: Y. Peled, A. Motil, L. Yaron, and M. Tur, "Slope-assisted fast distributed sensing in optical fibers with arbitrary Brillouin profile," Opt. Express 19, 19845-19854 (2011).

NPL 8: H. Lee, N. Hayashi, Y. Mizuno, and K. Nakamura, "Slope-assisted Brillouin optical correlation domain reflectometry: proof of concept," Photon. Jour. 8, 6802807 (2016).

Technical Problem

In a method using the frequency sweep of probe light, measurement time is inherently required, and complicated control is required for the frequency sweep of a light source. In addition, in a method of shaping a spectrum of light including a large number of frequency components, devices for performing spectrum shaping are required, and as such the number of system components increases, and modulation adjustment for spectrum generation becomes complicated.

The present invention has been made in view of the above problems, and an object of the present invention is to provide a measurement device and the like capable of simplifying a device configuration while shortening measurement time.

SUMMARY (1) The present invention relates to a measurement device including: a splitter configured to split light from a laser light source into two lights; an optical frequency shifting unit configured to shift a frequency of one of the two split lights; a first optical modulation unit configured to modulate intensity of one of the split lights and to generate probe light having two frequency components; a second optical modulation unit configured to generate pump light by pulsing the other split light; an optical detection unit configured to detect, when the probe light is incident from one end side of an optical fiber to be measured and the pump light is incident from the other end side of the optical fiber, light emitted from the other end side of the optical fiber; and a processing unit configured to measure, based on light intensity detected by the optical detection unit, temperature or distortion of the optical fiber, in which a frequency of a lower frequency component out of the two frequency components is a frequency at which Brillouin gain occurs by interaction with the pump light, and a frequency of a higher frequency component out of the two frequency components is a frequency at which Brillouin loss occurs by the interaction with the pump light.

In addition, the present invention relates to a measurement method including: a splitting step of splitting light from a laser light source into two lights; an optical frequency shifting step of shifting a frequency of one of the two split lights; a first optical modulation step of modulating intensity of one split light and generating probe light having two frequency components; a second optical modulation step of generating pump light by pulsing the other split light; an optical detection step of detecting, when the probe light is incident from one end side of an optical fiber to be measured and the pump light is incident from the other end side of the optical fiber, light emitted from the other end side of the optical fiber; and a processing step of measuring, based on light intensity detected by the optical detection step, temperature or distortion of the optical fiber, in which a frequency of a lower frequency component out of the two frequency components is a frequency at which Brillouin gain occurs by interaction with the pump light, and a frequency of a higher frequency component out of the two frequency components is a frequency at which Brillouin loss occurs by the interaction with the pump light.

According to the present invention, by using the probe light having two frequency components including one frequency component in which Brillouin gain occurs and the other frequency component in which Brillouin loss occurs, it is possible to measure the temperature or the distortion from received light intensity without requiring a frequency sweep. In addition, according to the present invention, since a device necessary for spectrum shaping of the probe light and the pump light can be omitted, thereby making it possible to simplify a device configuration.

(2) Further, in the measurement device and the measurement method according to the present invention, the processing unit (in the processing step) may measure the temperature or the distortion of the optical fiber based on the light intensity within a range in which a relationship between the light intensity detected by the optical detection unit and the temperature or the distortion of the optical fiber becomes a predetermined relationship.

(3) Additionally, in the measurement device and the measurement method according to the present invention, the processing unit (in the processing step) may measure, based on a temporal change in the light intensity detected by the optical detection unit, a temperature distribution of the optical fiber or a distortion distribution thereof.

According to the present invention, it is possible to measure a temperature distribution and a distortion distribution from a temporal change in received light intensity without requiring a frequency sweep.

(4) In addition, in the measurement device and the measurement method according to the present invention, the first optical modulation unit (in the first optical modulation step) may generate the probe light by modulating the intensity of the light, the frequency of which is shifted by the optical frequency shifting unit.

(5) Furthermore, the present invention relates to a method of adjusting the measurement device, the method including steps of: setting a frequency shift amount in the optical frequency shifting unit so as to prevent the two frequency components of the probe light from simultaneously receiving a gain by the Brillouin gain and a loss by the Brillouin loss; acquiring the light intensity detected by the optical detection unit each time a frequency of a modulation signal of the first optical modulation unit is changed; obtaining a Brillouin gain spectrum and a Brillouin frequency shift based on a relationship between the frequency of the modulation signal and the light intensity; and adjusting the frequency shift amount based on the Brillouin gain spectrum and the Brillouin frequency shift.

DETAILED DESCRIPTION

Hereinafter, embodiments of the present invention will be described. It is noted that the present embodiment described below does not unreasonably limit the contents of the present invention described in the scope of the claims. In addition, not all the configurations described in the present embodiment are essential configuration requirements of the present invention.

Figure 1:
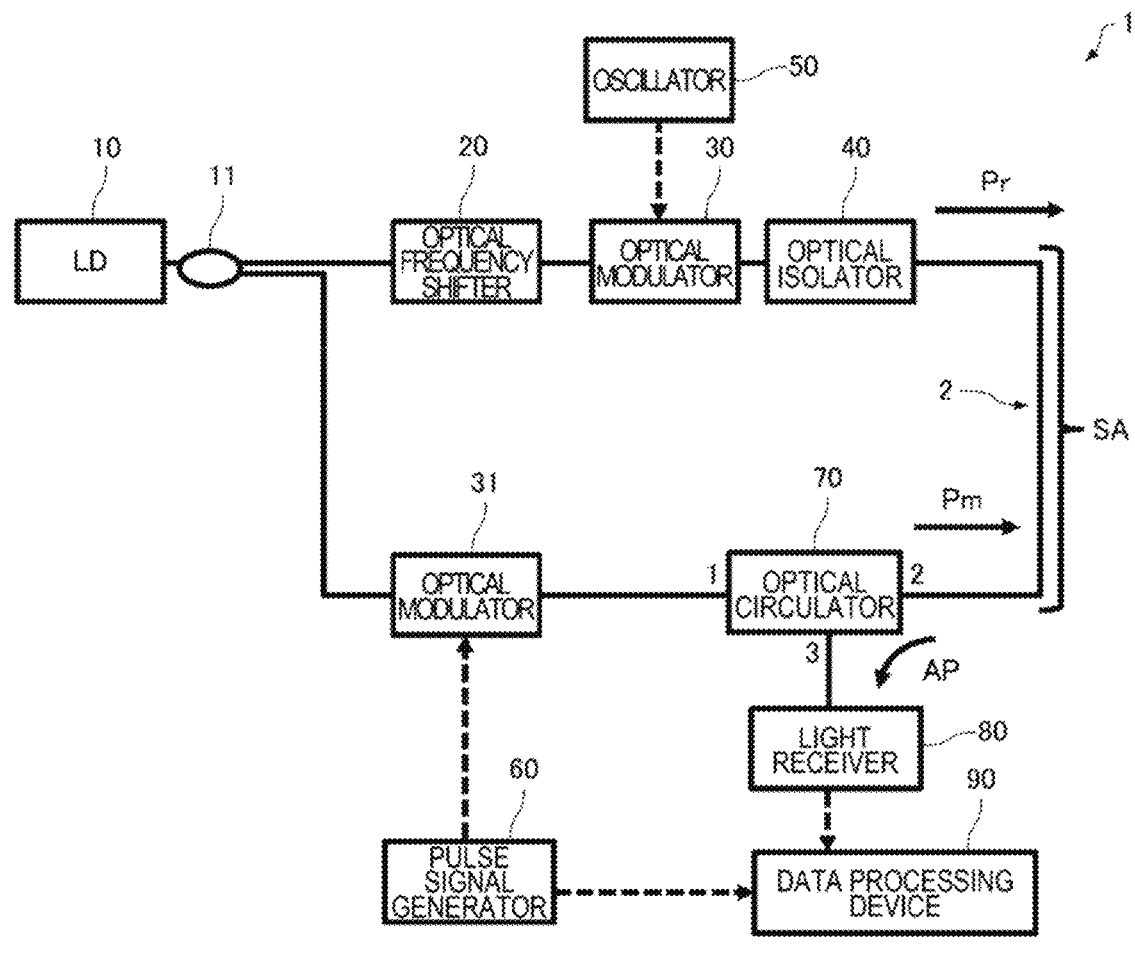
FIG. 1 is a diagram illustrating a configuration of a measurement device according to the present embodiment.

FIG. 1 is a diagram illustrating a configuration of a measurement device according to the present embodiment. A measurement device 1 is a device that measures temperature or distortion of a sensing area SA (a measurement target) of an optical fiber 2, and includes a laser light source 10 of a single wavelength, an optical splitter 11 (a splitter), an optical frequency shifter 20 (an optical frequency shifting unit), optical modulators 30 and 31 (a first optical modulation unit and a second optical modulation unit), an optical isolator 40, an oscillator 50, a pulse signal generator 60, an optical circulator 70, a light receiver 80 (an optical detection unit), and a data processing device 90 (a processing unit).

The optical splitter 11 splits light (a center frequency $v_0$) from the laser light source 10 into two lights so as to have a predetermined splitting ratio (for example, one to one).

The optical frequency shifter 20 shifts a frequency of any one of the two lights split by the optical splitter 11. In the example illustrated in FIG. 1, the frequency of the light incident on the optical modulator 30 out of the two split lights is shifted. A frequency shift amount by the optical frequency shifter 20 is defined as Av. The frequency shift amount $\Delta v$ is set such that a relationship between light intensity detected by the light receiver 80 (light intensity of probe light AP to be described later) and temperature or distortion becomes a predetermined relationship (corresponds to a predetermined function) within a predetermined range.

The optical modulator 30 modulates intensity of one of the split lights (light emitted from the optical frequency shifter 20), thereby generating probe light Pr having two frequency components. A frequency of a lower frequency component out of the two frequency components is a frequency at which Brillouin gain occurs due to interaction with pump light Pm, and a frequency of a higher frequency component out of the two frequency components is a frequency at which Brillouin loss occurs due to interaction with the pump light Pm. The probe light Pr passes through the optical isolator 40 and enters from one end side of the sensing area SA of the optical fiber 2. The oscillator 50 generates an intensity modulation signal for driving the optical modulator 30.

The optical modulator 31 applies intensity modulation by a periodic gate pulse to the other split light to pulse the light, thereby generating the pump light Pm. The pulse signal generator 60 generates an intensity modulation signal (a pulse signal) for driving the optical modulator 31.

The optical circulator 70 outputs, from a second port, the pump light Pm input to a first port so as to guide the pump light Pm to the other end side of the sensing area SA, and outputs, from a third port, the light (the probe light AP subjected to the action of Brillouin gain and Brillouin loss) emitted from the other end side of the sensing area SA and input to the second port so as to guide the light to the light receiver 80. The light receiver 80 detects the probe light AP and outputs the detected light intensity as an electric signal.

The data processing device 90 is a computer including a processor (a CPU or the like) and a storage unit (an RAM, a hard disk, or the like), and calculates the temperature or the distortion of the optical fiber 2 (the sensing area SA) based on the intensity of the signal from the light receiver 80 (the light intensity detected by the light receiver 80). For example, a function that approximates a relationship (for example, a proportional relationship) between the light intensity of the probe light AP and temperature or distortion is obtained by pre-calibration, and the light intensity detected by the light receiver 80 (the light intensity within a range in which the relationship between the light intensity of the probe light AP and the temperature or the distortion becomes a predetermined relationship) is substituted into the function, thereby obtaining the temperature or the distortion of the sensing area SA. In addition, the data processing device 90 calculates a temperature distribution or a distortion distribution of the sensing area SA based on a temporal change in the light intensity detected by the light receiver 80. For example, a relationship between a generation timing of each pulse of the pump light Pm (count number of generated pulses) and a position in the sensing area SA is obtained by pre-calibration, and the temperature or the distortion at each position of the sensing area SA is calculated based on the light intensity at the generation timing of each pulse of the pump light Pm using this relationship. The generation timing of each pulse of the pump light Pm is supplied as a trigger signal from the pulse signal generator 60.

In the optical fiber 2, a refractive index distribution (moving diffraction grating) is generated by a thermally induced acoustic wave. The pump light Pm incident on the other end side of the optical fiber 2 (the sensing area SA) is thereby reflected, and Stokes light with a downshifted frequency is generated and propagated rearwards (to the other end side of the optical fiber 2). Furthermore, electrostriction occurs due to the beat of the Stokes light and the pump light Pm, and the refractive index distribution occurs. This series of processing is repeated, and a Brillouin gain spectrum (BGS) is generated at a frequency lower than the frequency $v_0$ of the pump light Pm. A Brillouin loss spectrum (BLS) is generated at a frequency higher than the frequency $v_0$ of the pump light Pm. When the probe light Pr is incident (on one end side of the optical fiber 2) while facing the pump light Pm, the probe light AP subjected to the action of amplification by the Brillouin gain spectrum and attenuation by the Brillouin loss spectrum is emitted from the other end side of the optical fiber 2.

Figure 2:
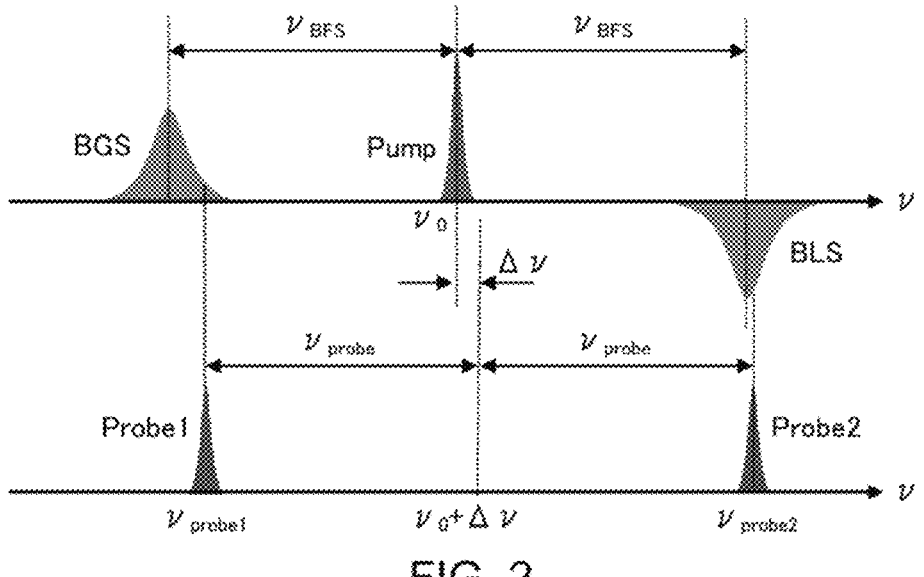
FIG. 2 is a diagram illustrating pump light, probe light, a Brillouin gain spectrum, and a Brillouin loss spectrum.

FIG. 2 illustrates the pump light, the probe light, the Brillouin gain spectrum, and the Brillouin loss spectrum. In FIG. 2, the horizontal axis represents the frequency (v). As illustrated in FIG. 2, in the optical fiber 2 (the sensing area SA), the Brillouin gain spectrum (BGS) occurs in a certain frequency range lower than the frequency $v_0$ of the pump light (Pump), and the Brillouin loss spectrum (BLS) occurs in a certain frequency range higher than the frequency $v_0$ of the pump light. A frequency difference $v_{BFS}$ between the frequency $v_0$ of the pump light and the center frequency of the Brillouin gain spectrum (and the Brillouin loss spectrum) is referred to as a Brillouin frequency shift (BF S). For example, when the wavelength of the pump light (the laser light source) is 1.5 µm, the Brillouin gain spectrum occurs at a frequency that is about 11 GHz lower than the frequency $v_0$ of the pump light, and the Brillouin loss spectrum occurs at a frequency that is about 11 GHz higher than the frequency $v_0$ of the pump light. The Brillouin frequency shift $v_{BFS}$ changes in proportion to the temperature or the distortion of the sensing area SA.

The probe light has two frequency components, and a frequency of a lower frequency component (Probe 1) is a frequency within the frequency range of the Brillouin gain spectrum, and a frequency of a higher frequency component (Probe 2) is a frequency within the frequency range of the Brillouin loss spectrum. As a result, the lower frequency component of the probe light is amplified by Brillouin gain, and the higher frequency component of the probe light is attenuated (loss occurs) by Brillouin loss. A frequency difference between a frequency ($v_0 + \Delta v$) of light incident on the optical modulator 30 (light emitted from the optical frequency shifter 20) and frequencies of two frequency components of probe light is defined as $v_{probe}$. For example, when the wavelength of the pump light (the laser light source) is 1.51 µm, the $v_{probe}$ is set to about 11 GHz. When the Brillouin frequency shift $v_{BFS}$ is equal to the $v_{probe}$, the sum of the amplification of the probe light due to Brillouin gain and the loss of the probe light due to Brillouin loss (a value obtained by subtracting the light intensity of the probe light Pr from the light intensity of the probe light AP) becomes 0.

Figure 3:
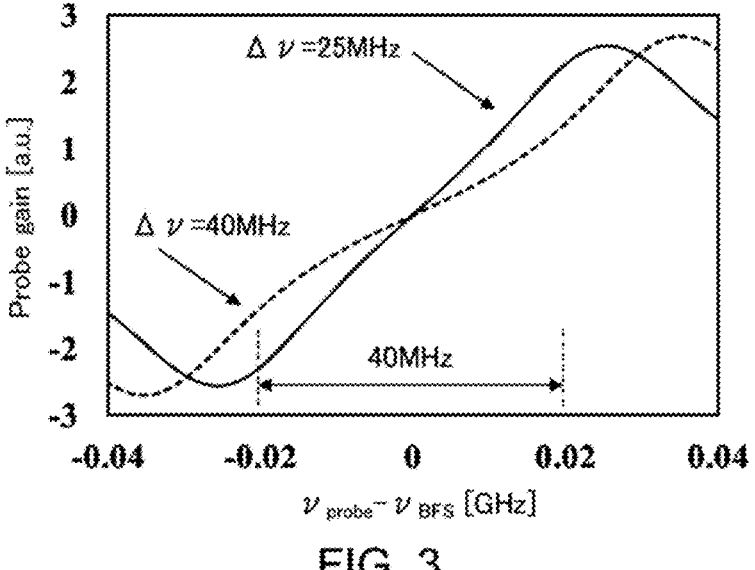
FIG. 3 is a diagram illustrating a relationship between a sum of amplification of probe light by Brillouin gain and loss of probe light by Brillouin loss and $v_{probe}-v_{BFS}$.

Here, when the frequency shift amount $\Delta v$ in the optical frequency shifter 20 is appropriately set, as illustrated in FIG. 3, it is possible to generate an area in which the sum (Probe gain) of the amplification of the probe light due to Brillouin gain and the loss of the probe light due to Brillouin loss can be approximately considered as changing in proportion to the temperature or the distortion of the optical fiber 2. In the example illustrated in FIG. 3, the temperature or the distortion of the optical fiber 2 is expressed by $v_{probe} - v_{BFS}$, and in a case where the frequency shift amount $\Delta v$ is 25 MHz, in the range of $v_{probe} - v_{BFS}$ from −0.02 GHz to 0.02 GHz (40 MHz), the Probe gain (equivalent to the light intensity of the probe light AP) can be regarded as changing (linearly responding) in proportion to the temperature or the distortion. Therefore, if the relationship between the light intensity of the probe light AP and the temperature or the distortion of the sensing area SA is calibrated and obtained in advance, the temperature or the distortion of the sensing area SA can be obtained from the light intensity detected by the light receiver 80 (the light intensity within the range of linear response to the temperature or the distortion) using the calibration result. It is noted that, by changing the frequency shift amount $\Delta v$, an area in which the Probe gain linearly responds to temperature or distortion can be moved parallel on the frequency axis, so that the range of measurable temperature or distortion can be flexibly changed. In addition, since the pump light is a pulse, a temporal change in the light intensity of the probe light AP detected by the light receiver 80 corresponds to a spatial temperature distribution or a distortion distribution of the sensing area SA. Therefore, the temperature distribution and the distortion distribution of the sensing area SA can be obtained by measuring the temporal change in the light intensity detected by the light receiver 80.

Figure 4:
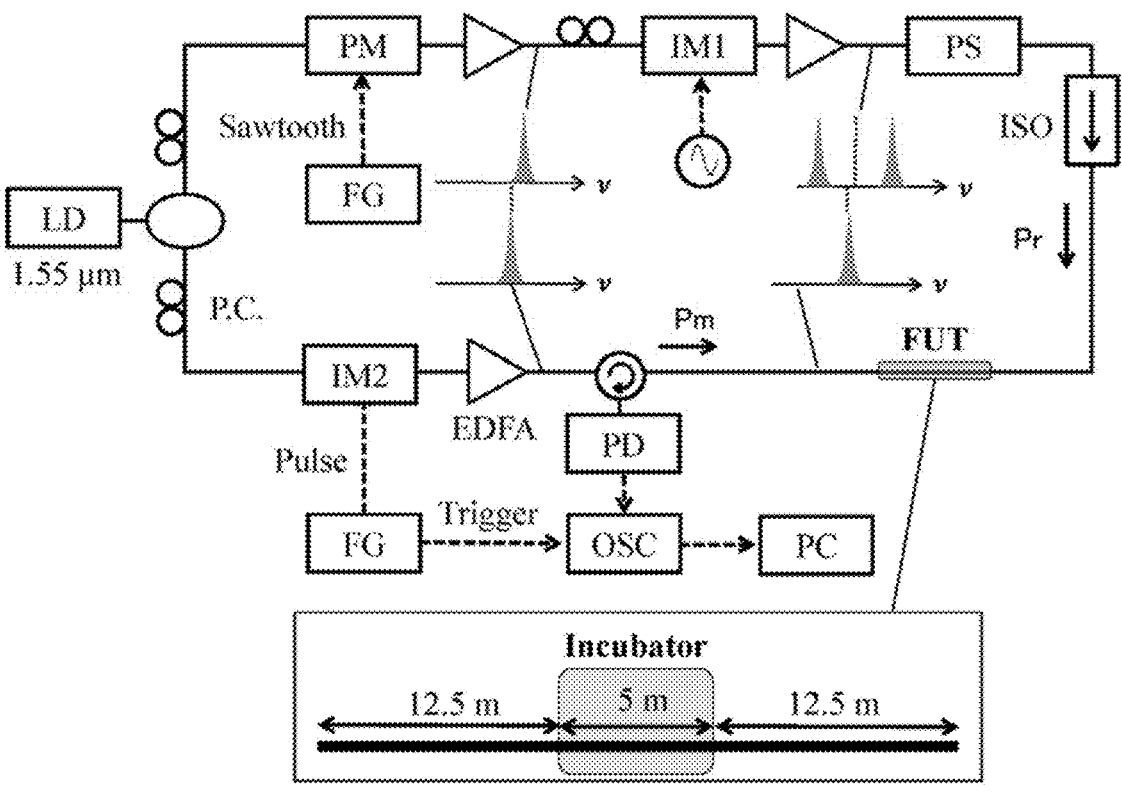
FIG. 4 is a diagram illustrating an experimental system of an experiment for confirming the principle of a method of the present embodiment.

FIG. 4 is a diagram illustrating an experimental system of an experiment for confirming the principle of a method of the present embodiment. In FIG. 4, an LD is a single-wavelength laser light source, a PM is a phase modulator (the optical frequency shifting unit), IM1 and IM2 are optical intensity modulators (the first optical modulation unit and the second optical modulation unit), a PS is a polarized wave scrambler, an ISO is an optical isolator, an FG is an arbitrary waveform generator (the signal generator), an EDFA is an optical amplifier, a PD is a photodetector, and an FUT is a fiber to be measured (the sensing area SA).

Light from the single-wavelength laser light source LD having a wavelength of 1.55 μm is split into two lights by an optical fiber coupler (a 3 dB coupler). An upper optical path of the experimental system is an optical path for generating the probe light Pr, and a lower optical path is an optical path for generating the pump light Pm.

In the optical path on the upper side of the experimental system, a frequency shift is provided to one split light by the phase modulator PM driven by a modulation signal of a sawtooth wave, and then intensity modulation is applied at a frequency near the Brillouin frequency shift by the Mach-Zehnder type optical intensity modulator IM1 driven by a modulation signal of a sine wave. Here, a modulation operation point of the optical intensity modulator IM1 is set to a point at which output light intensity is minimized (leaving only an intensity modulation frequency component), thereby making it possible to obtain the probe light Pr having two frequency components (a frequency component at which Brillouin gain occurs and a frequency component at which Brillouin loss occurs). In this experiment, a frequency shift amount ($\Delta v$) in the phase modulator PM is set to 25 MHz, and an intensity modulation frequency ($v_{probe}$) in the optical intensity modulator IM1 is set to 10.805 GHz. In the optical path on the lower side of the experimental system, intensity modulation is applied to the other split light by the optical intensity modulator IM2 driven by a pulsed modulation signal, thereby generating a pulse (the pump light Pm) having a pulse time width of 30 ns.

Here, spatial resolution is given by $\Delta z=cw/2n$. Here, c is a light velocity in vacuum, n is an effective refractive index of an optical fiber, and w is a pulse time width. Since the light velocity c is about $3\times10^8$ m/s and the effective refractive index n of the optical fiber is about 1.5, the spatial resolution $\Delta z$ of the experimental system is about 3 m. A repetition frequency of the pulse of the pump light Pm is set to 2.2 MHz. At this time, the maximum measurement range is 45 m.

Figure 5:
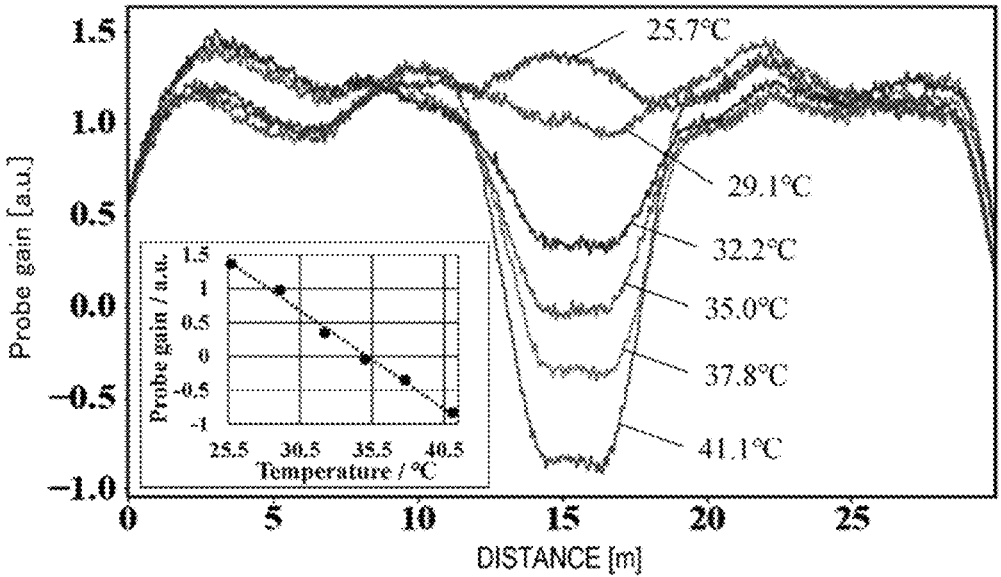
FIG. 5 is a diagram illustrating an experimental result of an experiment for measuring a temperature distribution of an optical fiber.

In this experiment, a temperature distribution is measured using an optical fiber of 30 m as the fiber to be measured FUT. An area of 5 m (a section of 12.5 m to 17.5 m from the end) in the center of the fiber to be measured FUT is placed in a thermostat (an incubator), and the temperature is changed from 25.7° C. to 41.1° C. The other area of the fiber to be measured FUT is left at room temperature. The experimental results are shown in FIG. 5. A graph in FIG. 5 is a result of measuring the distribution of the sum (the Probe gain) of the amplification of the probe light due to Brillouin gain and the loss of the probe light due to Brillouin loss when the temperatures of the central area of the fiber to be measured FUT are respectively set to 25.7° C., 29.1° C., 32.2° C., 35.0° C., 37.8° C., and 41.1° C. In the central area of the fiber to be measured FUT, the Probe gain significantly changes as the temperature is higher. In addition, the graph illustrated in the graph of FIG. 5 is a diagram illustrating a relationship between a temperature at a central position of the central area of the fiber to be measured FUT (the central position being located 15 m away from the end) and the Probe gain, and it can be seen that the Probe gain changes in proportion to the temperature.

Figure 6:
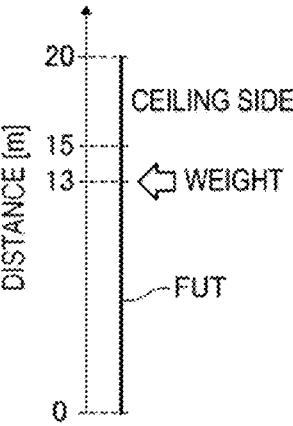
FIG. 6 is a diagram illustrating a fiber to be measured in an experiment for measuring a distortion distribution of the optical fiber.
Figure 7:
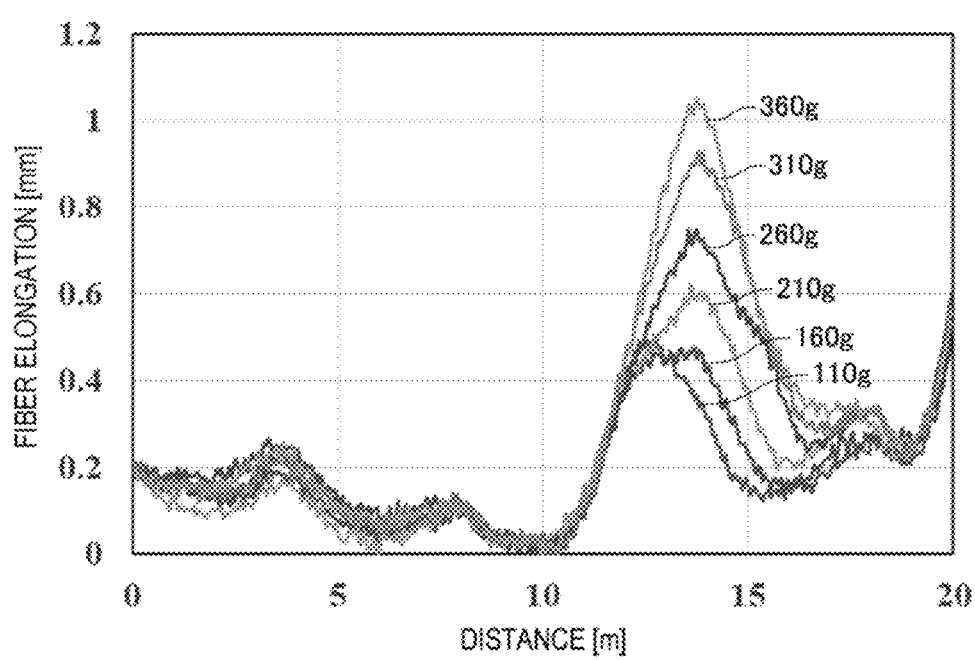
FIG. 7 is a diagram illustrating an experimental result of the experiment for measuring the distortion distribution of the optical fiber.

In addition, an experiment of measuring the distortion distribution of the optical fiber is performed using an experimental system similar to the experimental system of FIG. 4. As illustrated in FIG. 6, in this experiment, a weight is attached at a position of 7 m (distance of 13 m) from the end of the ceiling side of the fiber to be measured FUT of 20 m, and a distribution of tensile distortion (fiber elongation) due to the weight is measured. The fiber to be measured FUT is fixed to the ceiling at positions of distances of 15 m and 20 m with a tape, and the FUT of the lower side of 13 m is wound on a desk. The frequency shift amount ($\Delta v$) in the phase modulator PM is set to 35 MHz, and the intensity modulation frequency ($v_{probe}$) in the optical intensity modulator IM1 is set to 10.082 GHz. The spatial resolution of this measurement is 2 m. The experimental results are shown in FIG. 7. The graph in FIG. 7 shows results of measuring a fiber elongation distribution when weights (loads) attached to the fiber to be measured FUT are respectively set to 360 g, 310 g, 260 g, 210 g, 160 g, and 110 g. At a position near a distance of 13 m where the weight is attached, the larger the load is, the larger the distortion is.

According to the method of the present embodiment, probe light having two frequency components including a frequency component in which Brillouin gain occurs and a frequency component in which Brillouin loss occurs is used, thereby making it possible to measure temperature or distortion from received light intensity and to measure a temperature distribution and a distortion distribution from a temporal change in received light intensity without requiring a frequency sweep. In addition, since devices necessary for spectrum shaping of the probe light and the pump light can be omitted, the device configuration can be simplified. In addition, a modulation signal itself to be added to the first optical modulation unit in order to generate the probe light is a simple sine wave and does not need to have a complicated waveform, so that control is easy and stability is excellent.

Next, a method of adjusting the frequency shift amount $\Delta v$ in the optical frequency shifter 20 (adjustment method of the measurement device) will be described. Before the adjustment is performed, a reference area of the optical fiber 2 is determined. For example, a fiber having a certain length (for example, about 5 m) on the measurement device side including a laser light source and a modulator is set to a stable state in which a large temperature change and distortion are not applied, and this fiber is used as a reference area.

Figure 8:
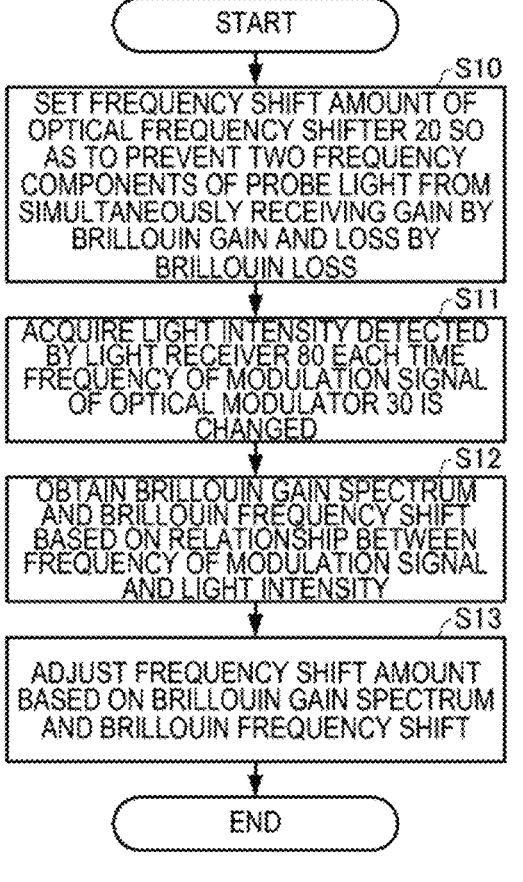
FIG. 8 is a flowchart illustrating a flow of a method of adjusting a frequency shift amount.

FIG. 8 is a flowchart illustrating a flow of the method of adjusting the frequency shift amount $\Delta v$. First, the frequency shift amount $\Delta v$ in the optical frequency shifter 20 is increased, and the frequency shift amount $\Delta v$ is set such that when a lower frequency component out of the two frequency components of the probe light Pr receives a gain due to Brillouin gain, a higher frequency component does not receive a loss due to Brillouin loss, and when the higher frequency component receives the loss due to Brillouin loss, the lower frequency component does not receive the gain due to Brillouin gain (that is, two frequency components of the probe light Pr are prevented from simultaneously receiving the gain due to Brillouin gain and the loss due to Brillouin loss) (step S10). In the experimental system of the present embodiment, the above condition is satisfied when the frequency shift amount $\Delta v$ is 60 MHz.

Next, the frequency (intensity modulation frequency, $v_{probe}$) of the modulation signal of the optical modulator 30 is changed little by little in a frequency range around 11 GHz close to the Brillouin frequency shift $v_{BFS}$, and distribution measurement is performed (step S11). However, in the light intensity detected by the light receiver 80 (the light intensity of the probe light AP), only the light intensity corresponding to the position of the reference area is focused and acquired.

Figure 9:
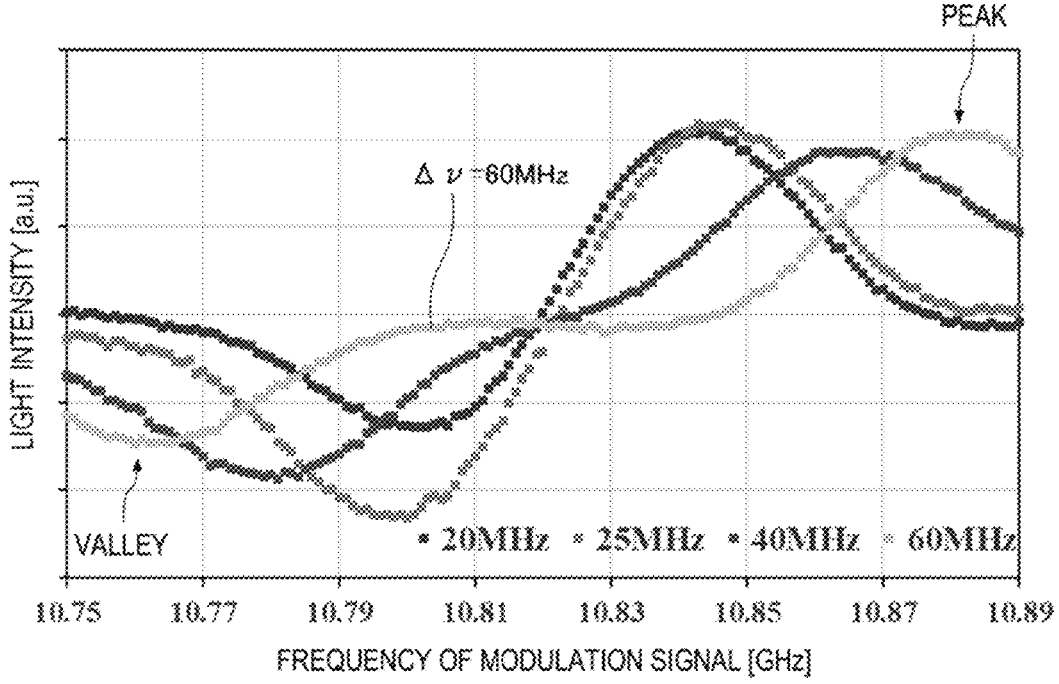
FIG. 9 is a graph in which light intensity acquired when a frequency shift amount is set to 60 MHz, 40 MHz, 25 MHz, and 20 MHz is plotted with respect to a frequency of a modulation signal.

Next, the shape of the Brillouin gain spectrum BGS and the Brillouin frequency shift $v_{BFS}$ are obtained based on a relationship between the frequency of the modulation signal and the acquired light intensity (step S12). FIG. 9 is a graph in which the light intensity acquired when the frequency shift amount $\Delta v$ is set to 60 MHz, 40 MHz, 25 MHz, and 20 MHz is plotted with respect to the frequency of the modulation signal. As illustrated in FIG. 9, the graph when the frequency shift amount $\Delta v$ is set to 60 MHz includes a peak and a valley sufficiently separated from each other, and the shape of the Brillouin gain spectrum BGS can be obtained from a portion of the peak, and the Brillouin frequency shift $v_{BFS}$ can be obtained from a frequency (a peak frequency) of the portion of the peak and the frequency shift amount $\Delta v$. When the peak and the valley overlap each other (the peak and the valley are not clearly separated), the frequency shift amount $\Delta v$ is further increased, and the procedure in step S11 is performed.

Next, based on the Brillouin gain spectrum BGS and the Brillouin frequency shift $v_{BFS}$, the frequency shift amount $\Delta v$ that can widen a region where the light intensity detected by the light receiver 80 linearly changes due to temperature or distortion is calculated by calculation on the PC, and the calculated frequency shift amount $\Delta v$ is set in the optical frequency shifter 20 as the adjusted frequency shift amount $\Delta v$ (step S13).

It is noted that the present invention is not limited to the above-described embodiments, and various modifications can be made. The present invention includes substantially the same configuration (for example, a configuration having the same function, method, and result, or a configuration having the same purpose and effect) as the configuration described in the embodiment. In addition, the present invention includes a configuration in which a non-essential portion of the configuration described in the embodiment is replaced. In addition, the present invention includes a configuration that achieves the same action and effect as the configuration described in the embodiment or a configuration that can achieve the same object. In addition, the present invention includes a configuration obtained by adding a known technique to the configuration described in the embodiment.

The invention claimed is:

1. A measurement device comprising:
a splitter configured to split light from a laser light source into two split lights;
an optical frequency shifter configured with a phase modulator, the phase modulator being configured to shift a frequency of one of the two split lights by an adjusted frequency shift amount by driving the phase modulator with a modulation signal of a sawtooth wave;

a first optical modulator configured to modulate an intensity of the one of the two split lights and to generate probe light having two frequency components;
a second optical modulator configured to generate pump light by pulsing the other of the two split lights;
an optical detector configured to detect, when the probe light is incident from one end side of an optical fiber to be measured and the pump light is incident from the other end side of the optical fiber, a light intensity of light emitted from the other end side of the optical fiber; and
a processor configured to be programmed to measure, based on the light intensity, a temperature or a distortion of the optical fiber,
wherein a frequency of a lower frequency component out of the two frequency components is a frequency at which Brillouin gain occurs by interaction with the pump light, and a frequency of a higher frequency component out of the two frequency components is a frequency at which Brillouin loss occurs by the interaction with the pump light,
an initial frequency shift amount in the optical frequency shifter is set so as to prevent the two frequency components of the probe light from simultaneously receiving a gain by the Brillouin gain and a loss by the Brillouin loss,
the light intensity is acquired by the optical detector each time a frequency of a modulation signal of the first optical modulator is changed,
a shape of a Brillouin gain spectrum is obtained based on a relationship between the frequency of the modulation signal and the light intensity,
a Brillouin frequency shift is obtained based on the initial frequency shift amount and a peak frequency, and the peak frequency is obtained from the relationship between the frequency of the modulation signal and the light intensity, and
the initial frequency shift amount is adjusted such that a relationship between the light intensity and one of the temperature and the distortion of the optical fiber becomes a predetermined relationship within a predetermined range based on the shape of the Brillouin gain spectrum and the Brillouin frequency shift to provide the adjusted frequency shift amount.

2. The measurement device according to claim 1,
wherein the processor is configured to measure, based on a temporal change in the light intensity, a temperature distribution of the temperature or a distortion distribution of the distortion of the optical fiber.

3. The measurement device according to claim 1,
wherein the first optical modulator is configured to generate the probe light by modulating the intensity of the one of the two split lights in which the frequency thereof has been shifted by the optical frequency shifter.

4. A measurement method for causing a processor to execute a process, the measurement method comprising executing on the processor the steps of:
splitting light from a laser light source into two split lights;
shifting, by a phase modulator, a frequency of one of the two split lights by an adjusted frequency shift amount by driving the phase modulator with a modulation signal of a sawtooth wave;
modulating an intensity of the one of the two split lights and generating probe light having two frequency components;

generating pump light by pulsing the other of the two split lights;

detecting, when the probe light is incident from one end side of an optical fiber to be measured and the pump light is incident from the other end side of the optical fiber, a light intensity of light emitted from the other end side of the optical fiber; and measuring, based on the light intensity, a temperature or a distortion of the optical fiber, wherein a frequency of a lower frequency component out of the two frequency components is a frequency at which Brillouin gain occurs by interaction with the pump light, and a frequency of a higher frequency component out of the two frequency components is a frequency at which Brillouin loss occurs by the interaction with the pump light, and the adjusted frequency shift amount, used in the splitting of the light from the laser light source, is obtained by executing on the processor the steps of:

setting an initial frequency shift amount of the frequency of the one of the two split lights so as to prevent the two frequency components of the probe light from simultaneously receiving a gain by the Brillouin gain and a loss by the Brillouin loss;

acquiring the light intensity each time a frequency of a modulation signal is changed in the modulating the intensity of the one of the two split lights and the generating the probe light;

obtaining a shape of a Brillouin gain spectrum based on a relationship between the frequency of the modulation signal and the light intensity;

obtaining a Brillouin frequency shift based on the initial frequency shift amount and a peak frequency, and the peak frequency is obtained from the relationship between the frequency of the modulation signal and the light intensity; and adjusting the initial frequency shift amount such that a relationship between the light intensity and one of the temperature and the distortion of the optical fiber becomes a predetermined relationship within a predetermined range based on the shape of the Brillouin gain spectrum and the Brillouin frequency shift to provide the adjusted frequency shift amount.

5. The measurement method according to claim 4, wherein the processor is configured to measure, based on a temporal change in the light intensity, a temperature distribution of the temperature or a distortion distribution of the distortion of the optical fiber.

6. The measurement method according to claim 4, wherein the processor is configured to generate the probe light by modulating the intensity of the one of the two split lights in which the frequency thereof has been shifted.

7. A measurement device comprising:

a splitter configured to split light from a laser light source into first and second split lights;

an optical frequency shifter configured with a phase modulator, the phase modulator being configured to receive the first split light and shift a frequency of the first split light by an adjusted frequency shift amount by driving the phase modulator with a modulation signal of a sawtooth wave so as to provide shifted first split light;

a first optical modulator configured to receive the shifted first split light to modulate an intensity thereof and to generate probe light having two frequency components;

a second optical modulator configured to receive the second split light to generate pump light by pulsing the second split light;

an optical detector configured to detect, when the probe light is incident from one end side of an optical fiber to be measured and the pump light is incident from the other end side of the optical fiber, a light intensity of light emitted from the other end side of the optical fiber; and a processor configured to be programmed to measure, based on the light intensity, a temperature or a distortion of the optical fiber, wherein a frequency of a lower frequency component out of the two frequency components is a frequency at which Brillouin gain occurs by interaction with the pump light, and a frequency of a higher frequency component out of the two frequency components is a frequency at which Brillouin loss occurs by the interaction with the pump light, the adjusted frequency shift amount in the optical frequency shifter is set so as to prevent the two frequency components of the probe light from simultaneously receiving a gain by the Brillouin gain and a loss by the Brillouin loss, the light intensity is acquired by the optical detector each time a frequency of a modulation signal of the first optical modulator is changed, a Brillouin gain spectrum and a Brillouin frequency shift are obtained based on a relationship between the frequency of the modulation signal and the light intensity, the adjusted frequency shift amount is obtained based on the Brillouin gain spectrum and the Brillouin frequency shift, and the adjusted frequency shift amount is set such that a relationship between the light intensity of the light emitted from the other end side of the optical fiber and the temperature or the distortion of the optical fiber satisfies a predetermined function.

8. The measurement device according to claim 7, wherein the processor is configured to measure, based on a temporal change in the light intensity, a temperature distribution of the temperature or a distortion distribution of the distortion of the optical fiber.

9. The measurement device according to claim 7, wherein the first optical modulator is configured to generate the probe light by modulating the intensity of the shifted first split light in which the frequency thereof has been shifted by the optical frequency shifter.

10. A measurement method for causing a processor to execute a process, the measurement method comprising executing on the processor the steps of:

splitting light from a laser light source into first and second split lights;

receiving the first split light and shifting, by a phase modulator, a frequency of the first split light by an adjusted frequency shift amount by driving the phase modulator with a modulation signal of a sawtooth wave so as to provide shifted first split light;

receiving, by a first optical modulator, the shifted first split light to modulate an intensity thereof and to generate probe light having two frequency components;

receiving, by a second optical modulator, the second split light to generate pump light by pulsing the second split light;

detecting, when the probe light is incident from one end side of an optical fiber to be measured and the pump light is incident from the other end side of the optical fiber, a light intensity of light emitted from the other end side of the optical fiber; and measuring, based on the light intensity, a temperature or a distortion of the optical fiber, wherein a frequency of a lower frequency component out of the two frequency components is a frequency at which Brillouin gain occurs by interaction with the pump light, and a frequency of a higher frequency component out of the two frequency components is a frequency at which Brillouin loss occurs by the interaction with the pump light, the adjusted frequency shift amount is set so as to prevent the two frequency components of the probe light from simultaneously receiving a gain by the Brillouin gain and a loss by the Brillouin loss, the light intensity is acquired each time a frequency of a modulation signal of the first optical modulator is changed, a Brillouin gain spectrum and a Brillouin frequency shift are obtained based on a relationship between the frequency of the modulation signal and the light intensity, the adjusted frequency shift amount is obtained based on the Brillouin gain spectrum and the Brillouin frequency shift, and the adjusted frequency shift amount is set such that a relationship between the light intensity of the light emitted from the other end side of the optical fiber and the temperature or the distortion of the optical fiber satisfies a predetermined function.

11. The measurement method according to claim 10, wherein the processor is configured to measure, based on a temporal change in the light intensity, a temperature distribution of the temperature or a distortion distribution of the distortion of the optical fiber.

12. The measurement method according to claim 10, wherein the processor is configured to generate the probe light by modulating the intensity of the shifted first split light in which the frequency thereof has been shifted.

* * * * *